United States Patent
Yoneda

(10) Patent No.: US 10,483,504 B2
(45) Date of Patent: Nov. 19, 2019

(54) SEALED BATTERY

(71) Applicant: TOYOTA JIDOSHA KABUSHIKI KAISHA, Toyota-shi, Aichi-ken (JP)

(72) Inventor: Koshiro Yoneda, Ichinomiya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 61 days.

(21) Appl. No.: 15/432,040

(22) Filed: Feb. 14, 2017

(65) Prior Publication Data
US 2017/0237049 A1 Aug. 17, 2017

(30) Foreign Application Priority Data
Feb. 16, 2016 (JP) ................. 2016-027098

(51) Int. Cl.
| | | |
|---|---|---|
| H01M 2/06 | (2006.01) | |
| H01M 2/10 | (2006.01) | |
| H01M 10/0525 | (2010.01) | |
| H01M 2/04 | (2006.01) | |
| H01M 2/30 | (2006.01) | |

(52) U.S. Cl.
CPC ............ H01M 2/06 (2013.01); H01M 2/043 (2013.01); H01M 2/1077 (2013.01); H01M 2/30 (2013.01); H01M 10/0525 (2013.01); H01M 2220/20 (2013.01)

(58) Field of Classification Search
CPC .. H01M 2/06; H01M 2/1077; H01M 10/0525; H01M 2220/20; H01M 2/043; H01M 2/30

USPC ......................................................... 429/174
See application file for complete search history.

(56) References Cited

U.S. PATENT DOCUMENTS

| | | | |
|---|---|---|---|
| 2003/0124420 A1* | 7/2003 | Fong ................. | H01M 2/06 429/181 |
| 2009/0186269 A1 | 7/2009 | Kim et al. | |
| 2013/0011699 A1* | 1/2013 | Kim ................. | H01H 85/36 429/7 |
| 2013/0143080 A1* | 6/2013 | Byun ................. | H01M 2/06 429/61 |
| 2014/0059847 A1 | 3/2014 | Nakamura et al. | |

(Continued)

FOREIGN PATENT DOCUMENTS

| | | |
|---|---|---|
| CN | 103682186 A | 3/2014 |
| JP | 11283588 A | 10/1999 |

(Continued)

Primary Examiner — Cynthia H Kelly
Assistant Examiner — Omar M Kekia
(74) Attorney, Agent, or Firm — Sughrue Mion, PLLC

(57) ABSTRACT

Provided is a sealed battery, which includes an insulating member arranged between a lid member and a collector terminal member. The insulating member includes a cylindrical portion that is positioned between a through hole and a connecting portion and surrounds the connecting portion, and a flat plate portion positioned between the lid member and the flange portion, and the flat plate portion has a first projecting portion projecting towards the lid member side, and a second projecting portion projecting towards the flange portion side. In a sectional view taken along a virtual plane including a central axis of the connecting portion, a peak of the first projecting portion is provided at a position closer to the central axis than a peak position of the second projecting portion.

11 Claims, 10 Drawing Sheets

(56) References Cited

U.S. PATENT DOCUMENTS

| | | | | |
|---|---|---|---|---|
| 2015/0072222 A1* | 3/2015 | Byun | ...................... | H01M 2/06 |
| | | | | 429/180 |
| 2015/0155532 A1* | 6/2015 | Harayama | ............... | H01M 2/06 |
| | | | | 429/179 |

FOREIGN PATENT DOCUMENTS

| JP | 2001-93486 A | 4/2001 |
|---|---|---|
| JP | 2001-135283 A | 5/2001 |
| JP | 2011-243559 A | 12/2011 |
| JP | 2014-7051 A | 1/2014 |
| JP | 2014-049396 A | 3/2014 |
| KR | 1020090081197 A | 7/2009 |

* cited by examiner

SEALED BATTERY

INCORPORATION BY REFERENCE

The disclosure of Japanese Patent Application No. 2016-027098 filed on Feb. 16, 2016 including the specification, drawings and abstract is incorporated herein by reference in its entirety.

BACKGROUND

1. Technical Field

The disclosure relates to a sealed battery.

2. Description of Related Art

Japanese Patent Application Publication No. 2014-049396 (JP 2014-049396 A) discloses a sealed battery in which a battery element is provided inside a sealed case. In JP 2014-049396 A, a connecting portion is used in a collector terminal member that is connected with the internal battery element. The connecting portion passes through a lid member that structures the case, and is used for exchanging electric power with outside.

A technology is employed where, in a through hole provided in the lid member, an insulating member is provided as a seal member between the connecting portion and the lid member, and the insulating member is compressed so that sealing performance in the through hole is improved.

In the above-mentioned sealed battery, projecting regions are provided on the collector terminal member side and the lid member side, respectively. Then, the insulating member is sandwiched between those regions from both sides and recessed from both sides, thereby improving sealing performance in the through hole.

SUMMARY

In JP 2014-049396 A, when there are manufacturing errors in height and position of the projection provided on the collector terminal member side and height and position of the projection provided in the lid member in each product, there is a concern that the recessed amounts can vary, which can cause inconsistent sealing performance of the sealed battery.

The disclosure provides a sealed battery with a structure that makes sealing performance of an insulating member consistent in a case where a connecting portion provided in a collector terminal member goes through a through hole provided in a lid member in the sealing battery.

The first aspect of the disclosure relates to a sealed battery, which includes a power generation element, a case member having a bottomed cylindrical shape, in which the power generation element is housed, a lid member that closes an opening of the case member and is provided with a through hole, a collector terminal member having one end connected with the power generation element inside the case member, and the other end that is arranged in the through hole and extended outside the lid member, and an insulating member arranged between the lid member and the collector terminal member.

The other end includes a connecting portion having a columnar shape, that goes through the through hole, and a flange portion that is arranged so as to be approximately parallel with the lid member. The insulating member includes a cylindrical portion that is positioned between the through hole and the connecting portion and surrounds the connecting portion, and a flat plate portion that is positioned between the lid member and the flange portion. The flat plate portion includes a first projecting portion projecting towards the lid member side, and a second projecting portion projecting towards the flange portion side. In a sectional view taken along a virtual plane including a central axis of the connecting portion, the first projecting portion is provided at a position where the first projecting portion is linearly symmetrical with each other with respect to the central axis, the second projecting portion is provided at a position where the second projecting portion is linearly symmetrical with each other with respect to the central axis, and a peak of the first projecting portion is provided at a position closer to the central axis than a peak position of the second projecting portion.

The second aspect of the disclosure relates to a sealed battery, which includes a power generation element, a case member having a bottomed cylindrical shape, in which the power generation element is housed, a lid member that closes an opening of the case member and is provided with a through hole, a collector terminal member having one end connected with the power generation element inside the case member, and the other end that is arranged in the through hole and extended outside the lid member, and an insulating member arranged between the lid member and the collector terminal member. The other end includes a connecting portion having a columnar shape, that goes through the through hole, and a flange portion that is arranged so as to be approximately parallel with the lid member. The insulating member includes a cylindrical portion that is positioned between the through hole and the connecting portion and surrounds the connecting portion, and a flat plate portion that is positioned between the lid member and the flange portion. The lid member includes a first projecting portion projecting towards the insulating member side, the flat plate portion includes a second projecting portion projecting towards the flange portion side. In a sectional view taken along a virtual plane including a central axis of the connecting portion, the first projecting portion is provided at a position where the first projecting portion is linearly symmetrical with each other with respect to the central axis, the second projecting portion is provided at a position where the second projecting portion is linearly symmetrical with each other with respect to the central axis, and a peak of the first projecting portion is provided at a position closer to the central axis than a peak position of the second projecting portion.

The third aspect of the disclosure relates to a sealed battery, which includes a power generation element, a case member having a bottomed cylindrical shape, in which the power generation element is housed, a lid member that closes an opening of the case member and is provided with a through hole, a collector terminal member having one end connected with the power generation element inside the case member, and the other end that is arranged in the through hole and extended outside the lid member, and an insulating member arranged between the lid member and the collector terminal member. The other end includes a connecting portion having a columnar shape, that goes through the through hole, and a flange portion that is arranged so as to be approximately parallel with the lid member. The insulating member includes a cylindrical portion that is positioned between the through hole and the connecting portion and surrounds the connecting portion, and a flat plate portion that is positioned between the lid member and the flange portion. The flat plate portion includes a first projecting portion projecting towards the lid member side, and the flange portion includes a second projecting portion projecting toward the insulating member side. In a sectional view taken along a virtual plane including a central axis of the connecting portion, the first projecting portion is provided at a position where the first projecting portion is linearly symmetrical with each other with respect to the central axis, the second projecting portion is provided at a position where the second projecting portion is linearly symmetrical with each other with respect to the central axis, and a peak of the first projecting portion is provided at a position closer to the central axis than a peak position of the second projecting portion.

With this structure, in a state where the insulating member is compressed by the lid member and the flange portion, external force is applied to the first projecting portion from the lid member, and external force is applied to the second projecting portion from the flange portion. As a result, due to a rotation moment, force acts on a distal end side of the cylindrical portion so that the cylindrical portion inclines towards the central axis side.

Because of this, when the other end is crimped, the cylindrical portion is centered with respect to the connecting portion, thereby making it possible to align the position of the central axis of the connecting portion and the position of the central axis of the cylindrical portion. Thus, it is possible to correct variation in positions when the cylindrical portion is assembled, and accurately position the cylindrical portion with respect to the connecting portion. Further, because of this, it is possible to prevent variation in compressibility.

The first projecting portion may be provided into a ring shape centering about the central axis, and the second projecting portion may be provided into a ring shape centering about the central axis.

With this sealed battery, it is possible to achieve consistent sealing performance of the insulating member in the case where the connecting portion provided in the collector terminal member goes through the through hole provided in the lid member.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
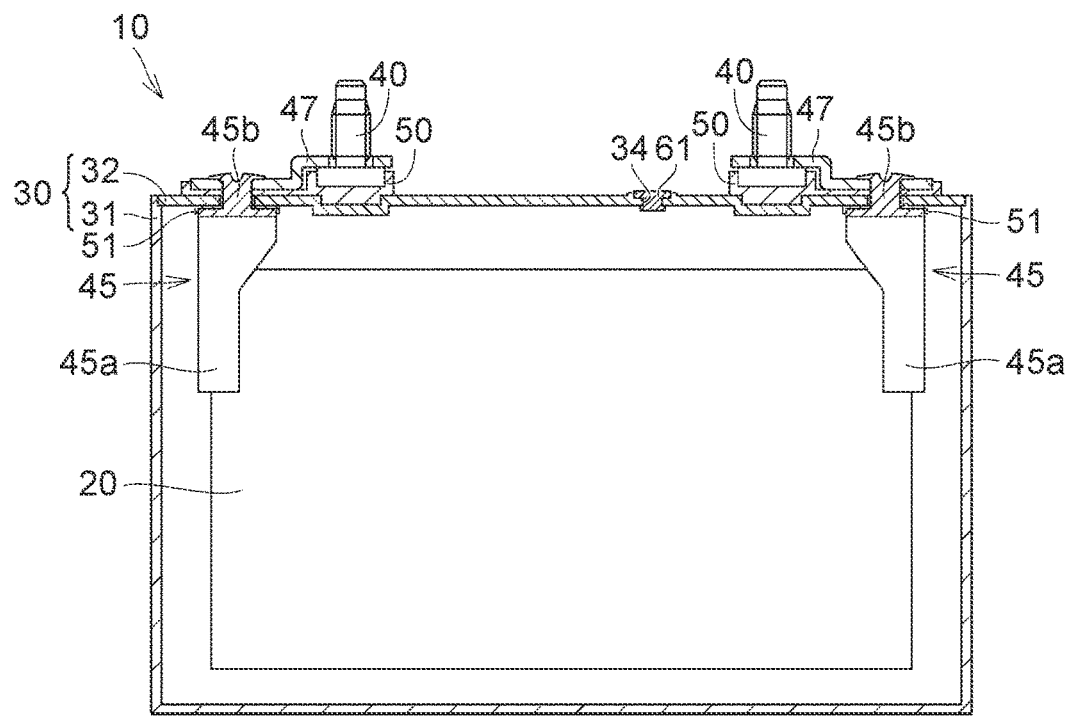
FIG. 1 is a longitudinal sectional view of an internal structure of a sealed battery according to the first embodiment.

Structures of sealed batteries according to the embodiments are explained with reference to the drawings. When numbers, amount, materials and so on are mentioned, the scope of the disclosure is not necessarily limited to those numbers, amount, and materials unless otherwise specified. The same reference numerals are used for the same or equivalent components, and there are instances where duplicated explanation is not given. It is originally planned to use the structures according to the embodiments as a combination where necessary. The relations of dimensions such as length, width, thickness, and depth are changed as necessary in order to clarify and simplify the drawings, and do not represent actual dimensional relations.

(The First Embodiment 1: Sealed Battery 10)

Figure 2:
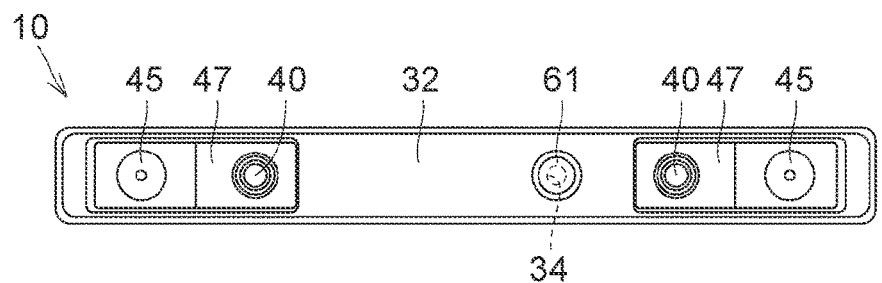
FIG. 2 is a plan view of the sealed battery according to the first embodiment.
Figure 3:
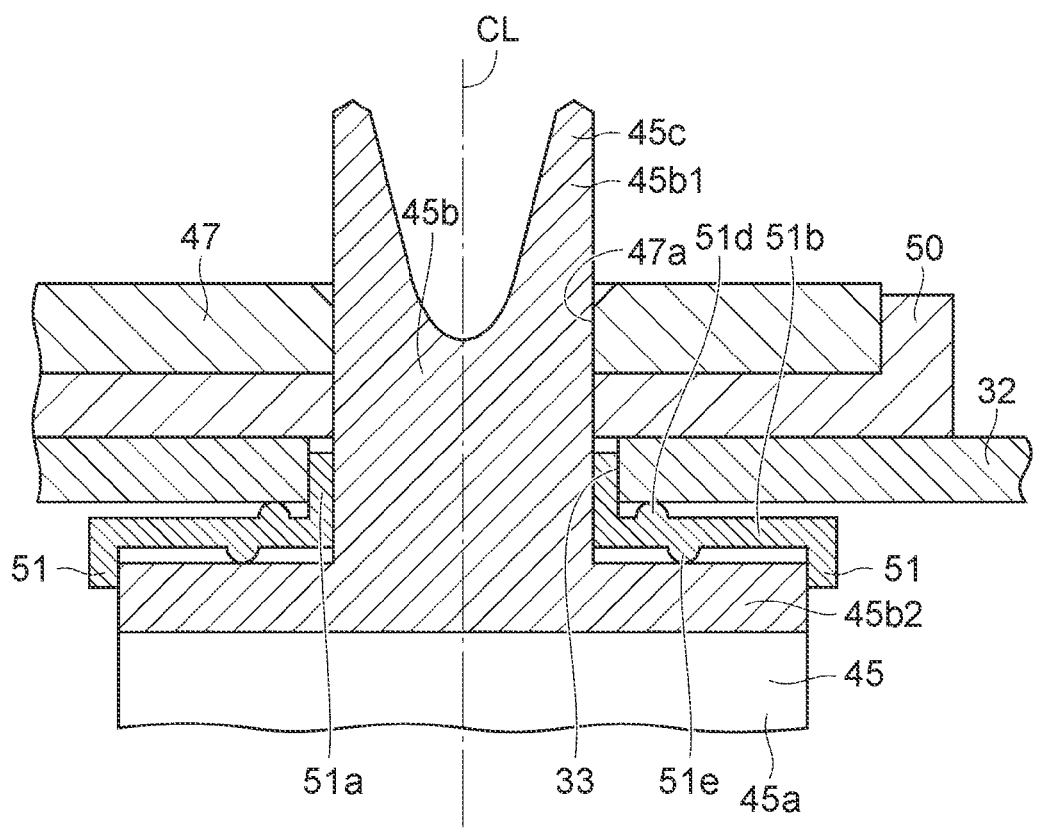
FIG. 3 is a longitudinal sectional view of a state before crimping in a through hole through which a connecting terminal according to the first embodiment passes.

A structure of a sealed battery 10 according to the embodiment is explained with reference to FIG. 1 to FIG. 3. FIG. 1 is a longitudinal sectional view of the internal structure of the sealed battery 10, FIG. 2 is a plan view of the sealed battery 10, and FIG. 3 is a longitudinal sectional view of a state before crimping in a through hole through which a connecting terminal according to the first embodiment passes. The sealed battery 10 is a nonaqueous electrolyte secondary battery such as a lithium ion secondary battery, and a plurality of the sealed batteries 10 are combined in series, thus forming a battery pack, and are mounted on a hybrid vehicle and so on. The battery pack serves as a power source of a hybrid vehicle, together with an internal combustion engine such as a gasoline engine and a diesel engine. However, the structure of the sealed battery 10 described below is not limited to a nonaqueous electrolyte secondary battery.

With reference to FIG. 1 and FIG. 2, the sealed battery 10 includes a power generation element 20, a case 30 in which the power generation element 20 is housed, fastening members 40 projecting from the case 30 outwardly, collector terminal members 45, one ends of which are connected with the power generation element 20, and the other ends of which are extended outside the case 30, insulating members (gaskets) 51 that are resin lid members arranged between the collector terminal members 45 and the case 30, respectively, plate-shaped external element members 47 connected with the collector terminal members 45, respectively, on an outer side of the case 30, and insulating members 50 that are resin lid members arranged between the external element members 47 and the case 30, respectively.

The power generation element 20 is made as follows. An electrode body, in which positive electrodes, negative electrodes and separators are laminated or wound, is impregnated with an electrolytic solution. When charging and discharging the sealed battery 10, a chemical reaction happens inside the power generation element 20 (strictly speaking, ion transport through the electrolytic solution happens between the positive electrode and the negative electrode), thereby generating a current flow.

The case 30 is a prism-shaped can having a case member 31 and a lid member 32 that are both made from metal such as aluminum. The case member 31 is a bottomed angular cylindrical member, one surface of which is open. Inside the case member 31, the power generation element 20 is housed. The lid member 32 is a flat plate-shaped rectangular member having a shape corresponding to the opening of the case member 31. The lid member 32 is joined to the case member 31 by welding in a state of closing the opening of the case member 31.

At a position in the lid member 32 close to its center, a liquid injection hole 34 is made. The liquid injection hole 34 is a through hole having a given inside diameter. The liquid injection hole 34 goes through the lid member 32 in the thickness direction of the lid member 32. The liquid injection hole 34 is used for injecting the electrolytic solution into the case 30 in which the power generation element 20 is housed in advance. The liquid injection hole 34 is sealed by a seal member 61 after the electrolytic solution is injected.

The fastening member 40 is a pillar-shaped member arranged in the insulating member 50 in a state where one end of the fastening member 40 (the upper end in the embodiment) projects outwardly on the upper surface of the lid member 32. In an area of the fastening member 40, which projects outside the sealed battery 10, threading is made by thread rolling, thereby forming a bolt.

Referring to FIG. 3, a through hole 33 is formed in the lid member 32 of the case 30, and the through hole 33 allows the other end (the upper end in the embodiment) of the collector terminal member 45 to be inserted into it. The through hole 33 is a hole having a given inside diameter. The through hole 33 goes through the lid member 32 in the thickness direction of the lid member 32.

The insulating member 50 electrically insulates the lid member 32 of the case 30 and the external element member 47 from each other. The insulating member 51 is arranged on the upper side of the collector terminal member 45. The insulating member 51 is an approximately plate-shaped member in which a gasket portion 51a is formed. The gasket portion 51a is a cylindrical portion inserted into the through hole 33. Details of the structure of the insulating member 51 are described later.

The insulating member 51 is interposed between the lid member 32 on the case member 31 side and the collector terminal member 45, and the gasket portion 51a is inserted into the through hole 33. Compressed by the lid member 32 and the collector terminal member 45, the insulating member 51 electrically insulates the lid member 32 and the collector terminal member 45 from one another.

It is preferred that a material for the insulating member 50 and the insulating member 51 be a material having excellent high temperature creep characteristics, that is a material having a long-term creep resistance against a thermal cycle of the sealed battery 10. A material of these insulating members is preferably a resin material or a composite material of resin and fiber, which is required to have a modulus of elasticity in a range of 0.01 GPa to 5 GPa. For example, polyamide 66 (PA66), tetra-fluoroethylene perfluoroalkyl vinyl ether copolymer (PFA) and so on are used suitably.

One ends 45a (lower ends in the embodiment) of the collector terminal members 45 are connected with a positive electrode plate and a negative electrode plate of the power generation element 20, respectively. The other ends 45b (upper ends in the embodiment) of the collector terminal members 45 include columnar shaped connecting portions 45b1 that go through the through holes 33, respectively, and flange portions 45b2 arranged so as to be approximately parallel with the lid member 32. Each of the connecting portions 45b1 is inserted into the through hole 33 of the lid member 32 and extended to the outer side (upper side) of the lid member 32.

In the connecting portion 45b1, a crimping portion 45c is formed, which is crimped to an insertion hole 47a of the external element member 47 as described later. It is preferred that aluminum is used as a material of the collector terminal member 45 on the positive electrode side, and copper is used as a material of the collector terminal member 45 on the negative electrode side.

The external element member 47 is a conductive plate-shaped member that is formed into a crank shape in a front view, and is electrically connected with the positive electrode or the negative electrode of the power generation element 20 through the collector terminal member 45. The external element member 47 and the collector terminal member 45 function as an energizing path that extracts electric power stored in the power generation element 20 or takes in electric power from outside to the power generation element 20. In the external element member 47, the insertion hole 47a (see FIG. 3) and an external terminal hole are made, which go through the external element member 47 in its thickness direction. The other end 45b of the collector terminal member 45 is inserted into the insertion hole 47a.

Figure 4:
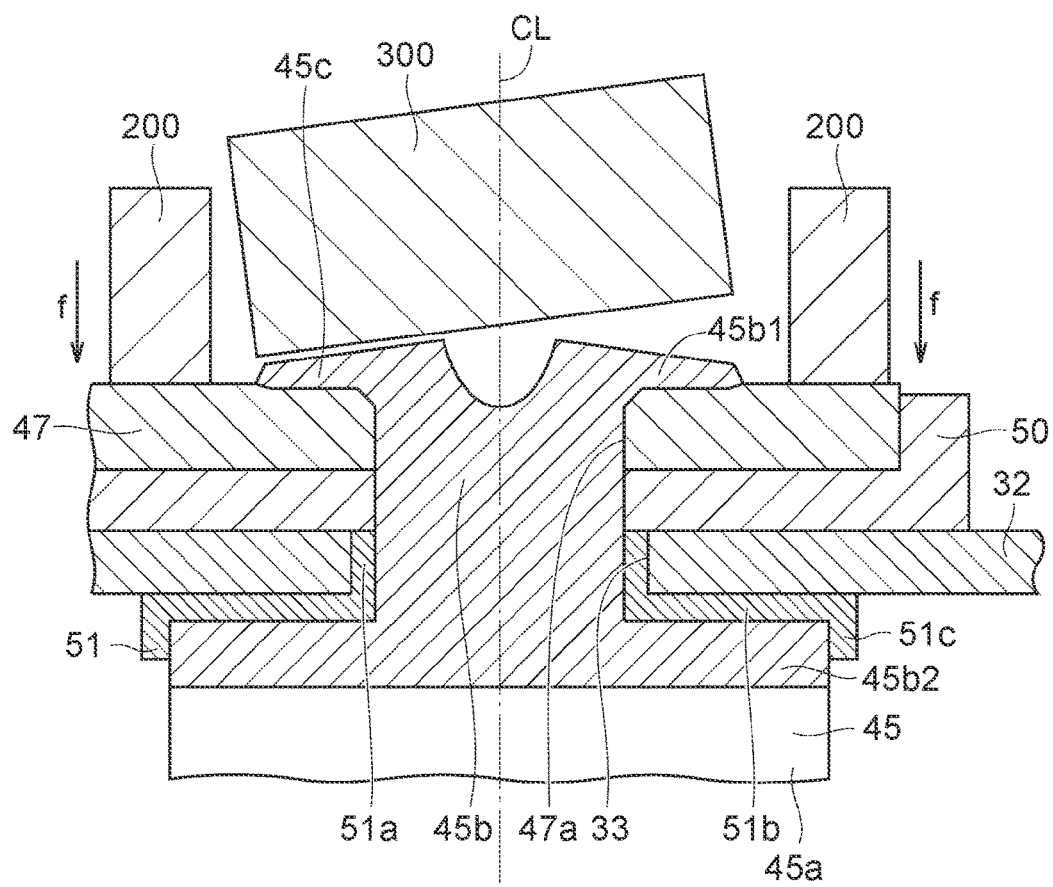
FIG. 4 is a longitudinal sectional view of a crimped state in the insertion hole through which a crimping portion according to the first embodiment passes.

With reference to FIG. 4, how to crimp the crimping portion 45c in the other end 45b is explained. FIG. 4 is a longitudinal sectional view of the crimping portion 45c crimped in the insertion hole 47a through which the crimping portion 45c goes. In a state where the external element member 47 is pressed by a compression tool 200 in an arrow f direction, the crimping portion 45c of the other end 45b is expanded outwardly into an approximately disk shape by using a crimping jig 300. Thus, crimping of the crimping portion 45c is completed. Also, the insulating member 51 is kept compressed by the lid member 32 and the flange portion 45b2.

(Structure of the Insulating Member 51)

Figure 5:
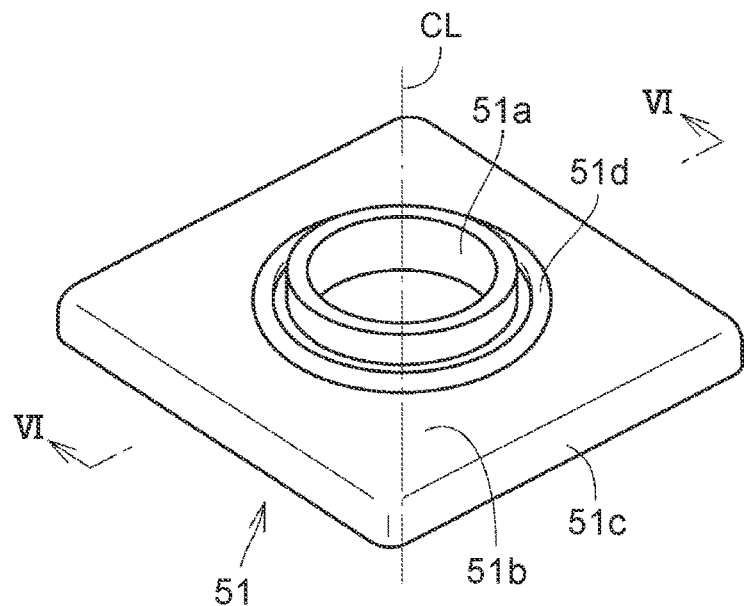
FIG. 5 is a perspective view of an insulating member according to the first embodiment.
Figure 6:
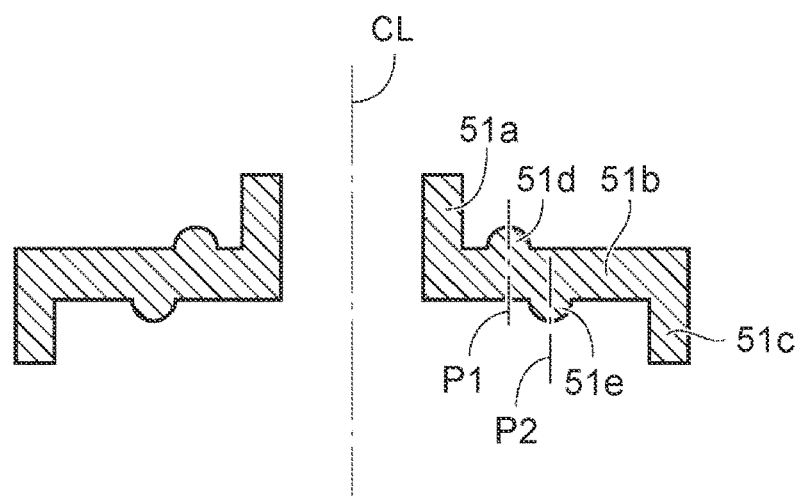
FIG. 6 is a perspective sectional view taken along the line VI-VI in FIG. 5.
Figure 7:
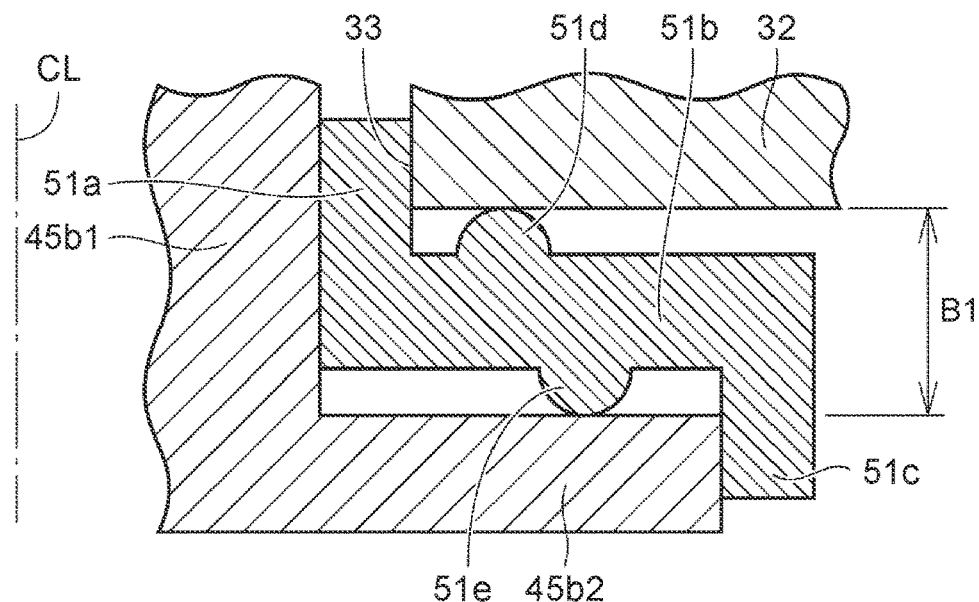
FIG. 7 is the first schematic view of an inspection range of the insulating member according to the first embodiment.

Next, with reference to FIG. 5 to FIG. 7, a structure of the insulating member 51 is explained. FIG. 5 is a perspective view of the insulating member 51, FIG. 6 is a perspective sectional view taken along the line VI-VI in FIG. 5, and FIG. 7 is a schematic view of how a load is applied to the insulating member 51.

With reference to FIG. 5 and FIG. 6, the insulating member 51 includes the gasket portion 51a and a flat plate portion 51b. As described above, the gasket portion 51a is positioned between the through hole 33 and the connecting portion 45b1. The flat plate portion 51b is positioned between the lid member 32 and the flange portion 45b2. The flat plate portion 51b has a rectangular shape in the embodiment, and includes a peripheral edge portion 51c in the edge of the flat plate portion 51b. The peripheral edge portion 51c extends in the opposite direction of the gasket portion 51a.

In the flat plate portion 51b, a first projecting portion 51d is provided, projecting towards the side where the gasket portion 51a is provided (the lid member 32 side). In the embodiment, the first projecting portion 51d has a ring-like form centering about the central axis CL of the gasket portion 51a. Therefore, in a section including the central axis CL of the connecting portion 45b1, the first projecting portion 51d is provided at a position where the first projecting portion 51d is linearly symmetrical with each other with respect to the central axis CL.

In the flat plate portion 51b, a second projecting portion 51e is provided, projecting towards the opposite side of the side where the gasket portion 51a is provided (the flange portion 45b2 side). In the embodiment, the second projecting portion 51e has a ring-like form centering about the central axis CL of the gasket portion 51a. Therefore, in a section taken along a plane including the central axis CL of the connecting portion 45b1, the second projecting portion 51e is provided at a position where the second projecting portion 51e is linearly symmetrical with each other with respect to the central axis CL.

Sectional shapes of the first projecting portion 51d and the second projecting portion 51e according to the embodiment are approximately semispherical, and their peak positions are provided as follows. The peak position P1 of the first projecting portion 51d is closer to the central axis CL than the peak position P2 of the second projecting portion 51e. This means that the second projecting portion 51e is provided on an outer side of the first projecting portion 51d when seen from the central axis CL.

Figure 8:
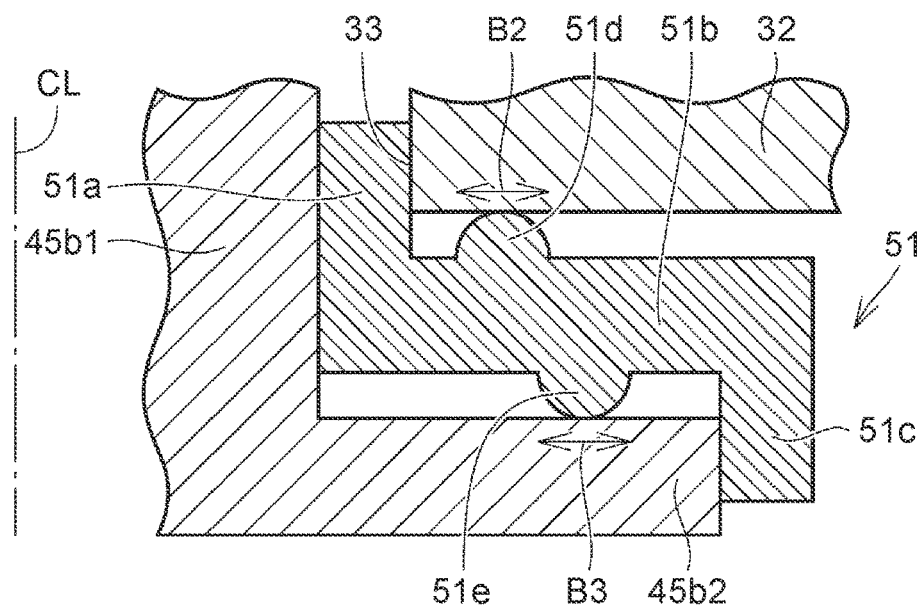
FIG. 8 is the second schematic view of inspection ranges of the insulating member according to the first embodiment.
Figure 9:
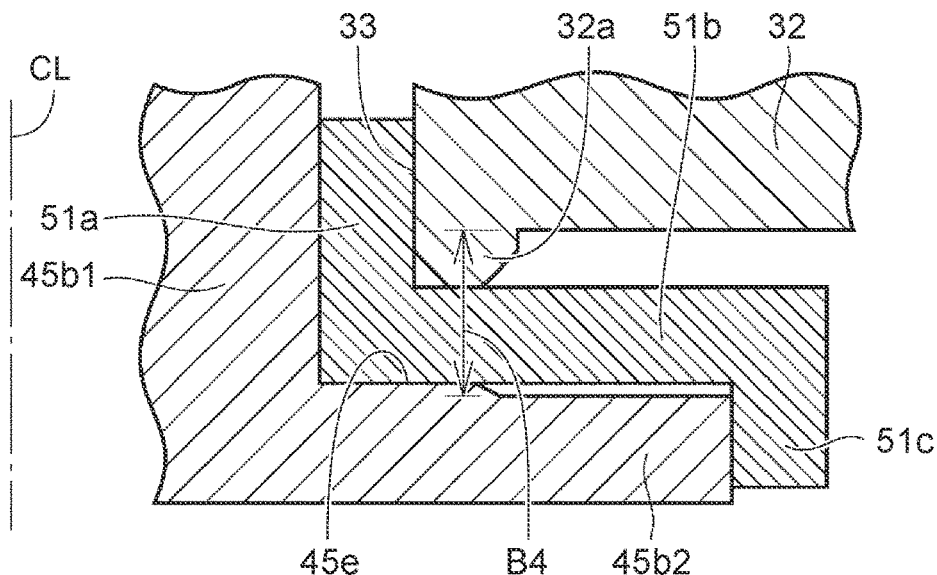
FIG. 9 is the first schematic view of an inspection range according to the related art.
Figure 10:
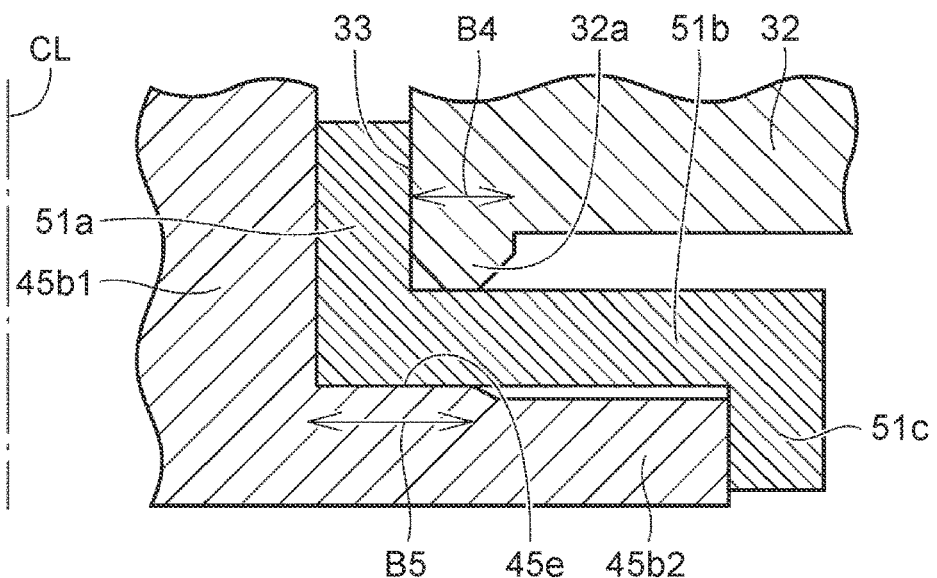
FIG. 10 is the second schematic view of an inspection range according to the related art.
Figure 11:
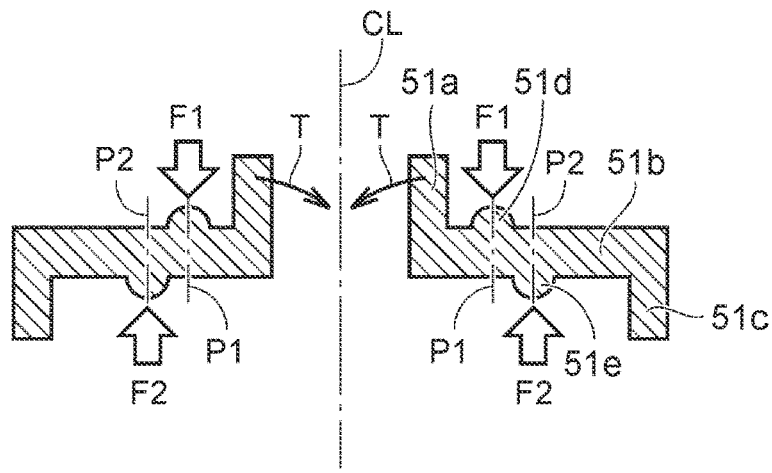
FIG. 11 is a schematic view of how a load is applied to the insulating member according to the first embodiment.

Next, with reference to FIG. 7 to FIG. 11, action effects of the insulating member 51 having the foregoing structure are explained. FIG. 7 and FIG. 8 are first and second schematic views of inspection ranges of the insulating member 51. FIG. 9 and FIG. 10 are first and second schematic views of inspection ranges according to the related art, and FIG. 11 is a schematic view of how a load is applied to the insulating member 51.

With reference to FIG. 7, the thickness inspection of the first projecting portion 51d and the second projecting portion 51e is done by inspecting the sum (B1) of the thicknesses of the first projecting portion 51d, the flat plate portion 51b, and the second projecting portion 51e provided in the same insulating member 51. The thickness of the insulating member 51 according to the embodiment is the sum of the thicknesses of the first projecting portion 51d, the flat plate portion 51b, and the second projecting portion 51e before the compression, and, on the other hand, it becomes approximately the thickness of the flat plate portion 51b after the compression as shown in FIG. 4. Hence, compressibility obtained from the dimensional ratio between before and after the compression largely depends on the thicknesses of the first projecting portion 51d and the second projecting portion 51e.

Even when there are dimensional errors where the thicknesses of the first projecting portion 51d and the second projecting portion 51e are different in the plurality of insulating members 51, the first projecting portion 51d and the second projecting portion 51e are compressed in the end. Therefore, it is possible to reduce variation in compressibility based on dimensional errors in the thicknesses of the first projecting portion 51d and the second projecting portion 51e, and, by compressing the insulating member as designed, it is possible to prevent inconsistent sealing performance of the sealed battery 10.

With reference to FIG. 8, in the insulating member 51 having the foregoing structure, the first projecting portion 51d and the second projecting portion 51e are provided in the flat plate portion 51b of the same insulating member 51. Therefore, when an inspection is carried out to see if there is any scratch on the insulating member 51, it is only necessary to inspect a range where the first projecting portion 51d is formed (the range B2 in the drawing) and a range where the second projecting portion 51e is formed (the range B3 in the drawing), to which large pressure is applied. Therefore, it is possible to reduce the inspection ranges.

Meanwhile, FIG. 9 shows the structure disclosed in the foregoing JP 2014-049396 A. Sealing performance is ensured as a flat plate portion 51b is deformed largely by a projecting portion 32a and a step portion 45e. Therefore, the sum (B4) of the thicknesses of the projecting portion 32a, the flat plate portion 51b, and the step portion 45e affects compressibility. This means that dimensional errors in these three components directly affect variation in compressibility.

Further, with reference to FIG. 10, in the case of structure disclosed in the foregoing JP 2014-049396 A, when inspecting whether or not there is any scratch on an insulating member 51, it is necessary to inspect a range facing the projecting portion 32a provided in the lid member 32 (the range B4 in the drawing) and a range facing the wide step portion 45e provided in a flange portion 45b2 (the range B5 in the drawing). Therefore, in the case of the foregoing JP 2014-049396 A, the inspection ranges become wide.

Further, in the case of the structure disclosed in the foregoing JP 2014-049396 A, it is necessary to form the projecting portion 32a and the step portion 45e in different components, which are the lid member 32 and the flange portion 45b2. Therefore, dimensional accuracy management becomes complex at the time of manufacturing. On the other hand, in the embodiment, the first projecting portion 51d and the second projecting portion 51e are provided in the flat plate portion 51b of the same insulating member 51, and dimensional accuracy management at the time of manufacturing becomes easy.

With reference to FIG. 11, more action effects of the embodiment are explained. In the insulating member 51 according to the embodiment, the first projecting portion 51d is provided at the position so that the first projecting portion 51d is linearly symmetrical with each other with respect to the central axis CL, and the second projecting portion 51e is also provided at a position so that the second projecting portion 51e is linearly symmetrical with each other with respect to the central axis CL. Further, the peak of the first projecting portion 51d is provided at a position closer to the central axis CL than the peak position of the second projecting portion 51e.

With this structure, in a state where the insulating member 51 is compressed by the lid member 32 and the flange portion 45b2, external force F1 is applied to the first projecting portion 51d by the lid member 32, and external force F2 is applied to the second projecting portion 51e by the flange portion 45b2. As a result, due to a rotation moment, force acts on a distal end side of the gasket portion 51a so that the gasket portion 51a is inclined towards the central axis CL side.

Because of this, when the other end 45b is crimped, the gasket portion 51a is centered with respect to the connecting portion 45b1, thereby making it possible to align the position of the central axis of the connecting portion 45b1 and the position of the central axis of the gasket portion 51a. Thus, it is possible to correct variation in positions when the gasket portion 51a is assembled, and to accurately position the gasket portion 51a with respect to the connecting portion 45b1. Further, because of this, it is possible to prevent variation in compressibility, thereby ensuring sealing performance of the sealed battery 10.

(Modifications)

Figure 12:
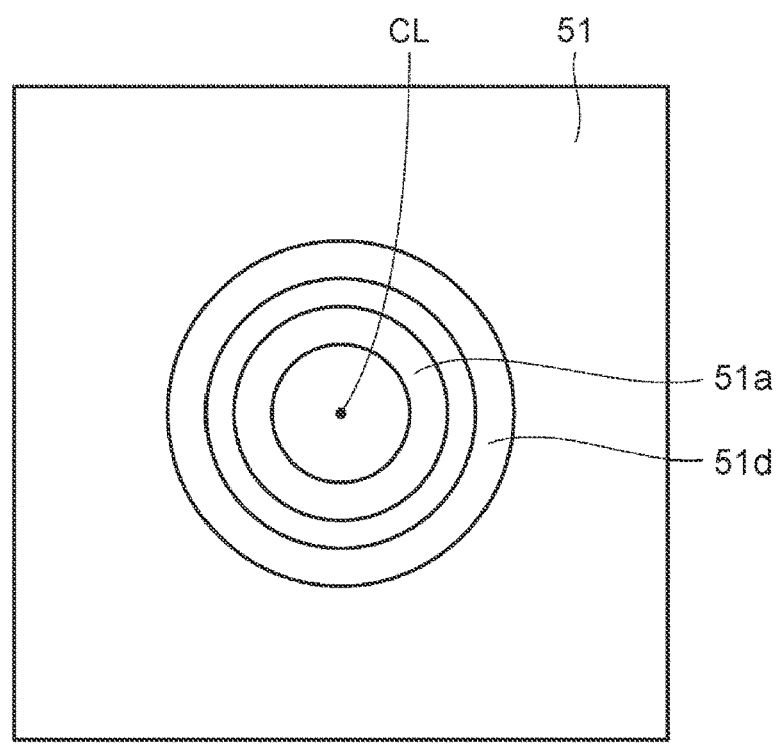
FIG. 12 is a plan view of the insulating member according to the first embodiment.
Figure 13:
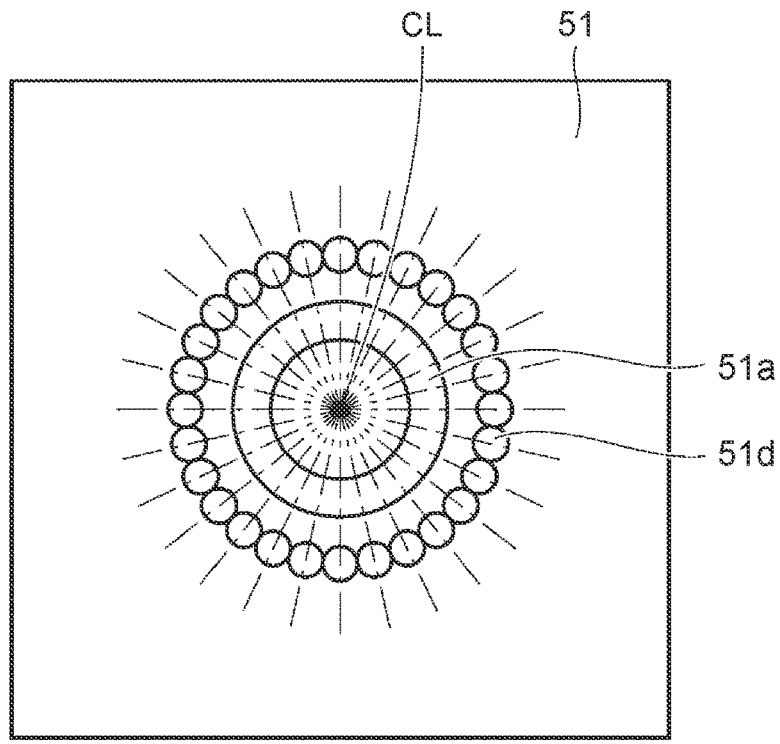
FIG. 13 is a plan view of a modification of the insulating member according to the first embodiment.
Figure 14:
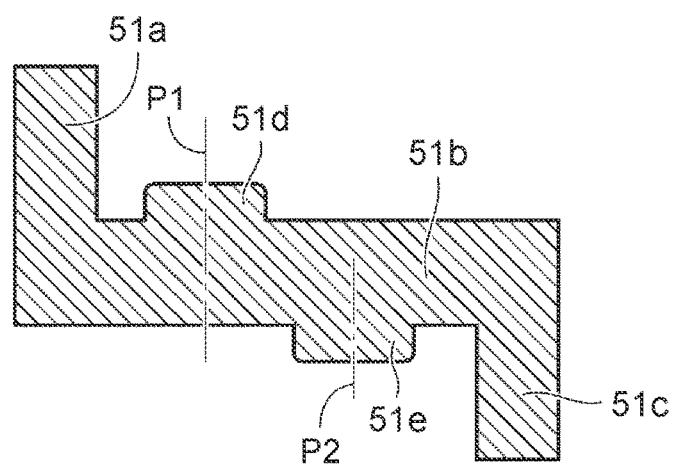
FIG. 14 is a sectional view of another modification of the insulating member according to the first embodiment.
Figure 15:
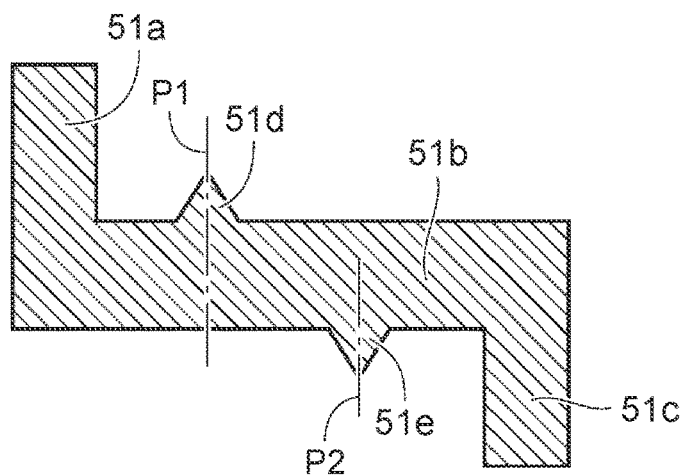
FIG. 15 is a sectional view of yet another modification of the insulating member according to the first embodiment.
Figure 16:
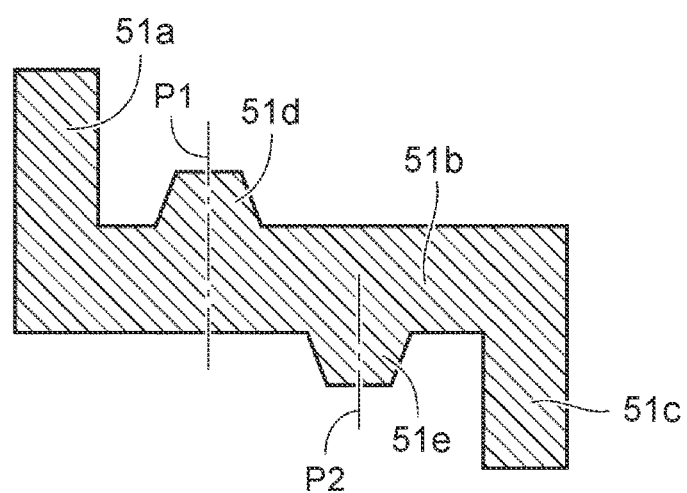
FIG. 16 is a sectional view of yet another modification of the insulating member according to the first embodiment.

With reference to FIG. 12 to FIG. 16, modifications of the insulating member 51 are explained. FIG. 12 is a plan view of the insulating member 51, FIG. 13 is a plan view of a modification of the insulating member 51, and FIG. 14 to FIG. 16 are sectional views of the other modifications of the insulating member 51.

As shown in FIG. 12, the first projecting portion 51$d$ provided in the insulating member 51 is provided to have a ring shape centering about the central axis CL. Although not shown, the second projecting portion 51$e$ is also provided to have a ring shape centering about the central axis CL.

Meanwhile, as shown in FIG. 13, the first projecting portion 51$d$ does not need to have a single type of ring shape, and, for example, a plurality of semicircular projecting portions may be arranged into a ring shape to structure the first projecting portion 51$d$. In this case, the semicircular projecting portions are provided at positions so that the semicircular projecting portions are linearly symmetrical with each other with respect to the central axis CL. Further, intervals between the semicircular projecting portions are set so that sealing performance is ensured in the state where the insulating member 51 is compressed by the lid member 32 and the flange portion 45$b$2. The second projecting portion 51$e$ is similar to the first projecting portion 51$d$.

(The Other Modifications)

With reference to FIG. 14 to FIG. 16, the other modifications of the insulating member 51 are explained. The shapes of the foregoing first projecting portion 51$d$ and second projecting portion 51$e$ are selected so that their sectional shapes are semicircular when seen in sections taken along a virtual plane including the central axis CL of the connecting portion 45$b$1. However, in the modifications described below, the sectional shapes are different.

In the first projecting portion 51$d$ and the second projecting portion 51$e$ shown in FIG. 14, their sectional shapes seen in a section taken along a virtual plane including the central axis CL of the connecting portion 45$b$1 are a rectangular shape. In this case, it is preferred that the peak position P1 of the first projecting portion 51$d$ and the peak position P2 of the second projecting portion 51$e$ are the central position of the upper side of the first projecting portion 51$d$ and the central position of the lower side of the second projecting portion 51$e$, respectively.

In the first projecting portion 51$d$ and the second projecting portion 51$e$ shown in FIG. 15, that their sectional shapes seen in a section taken along a virtual plane including the central axis CL of the connecting portion 45$b$1 are a triangular shape. In this case, it is preferred that the peak position P1 of the first projecting portion 51$d$ and the peak position P2 of the second projecting portion 51$e$ are peaks of the triangles of the first projecting portion 51$d$ and the second projecting portion 51$e$, respectively.

In the first projecting portion 51$d$ and the second projecting portion 51$e$ shown in FIG. 16, their sectional shapes seen in a section taken along a virtual plane including the central axis CL of the connecting portion 45$b$1 are a trapezoidal shape. In this case, it is preferred that, as the peak position P1 of the first projecting portion 51$d$ and the peak position P2 of the second projecting portion 51$e$, the central position of the upper side is used for the first projecting portion 51$d$, and the central position of the lower side is used for the second projecting portion 51$e$, respectively.

Even with the insulating members 51 having the foregoing modified shapes, it is possible to obtain action effects similar to those of the insulating members 51 having the semicircular sectional shape.

It is also possible to apply the foregoing modifications to an insulating member according to each embodiment described below.

(Second Embodiment)

Figure 17:
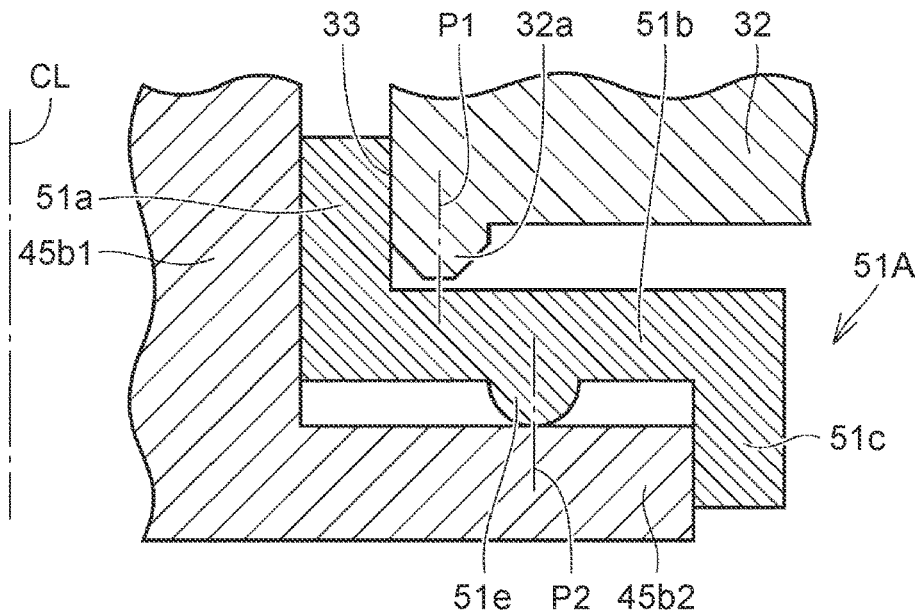
FIG. 17 is a view of a sectional shape of an insulating member according to the second embodiment.

Next, with reference to FIG. 17, a shape of an insulating member 51A according to the second embodiment is explained. FIG. 17 is a view of a sectional shape of the insulating member 51A.

In comparison with the structure of the insulating member 51 according to the first embodiment, only the second projecting portion 51$e$ is formed, and the first projecting portion 51$d$ is not formed in an insulating member 51A according to this embodiment. As a substitute for the first projecting portion 51$d$, a first projecting portion 32$a$ is provided in a lid member 32, projecting towards a flat plate portion 51$b$ side of the insulating member 51A.

Also, the peak position P1 of the first projecting portion 32$a$ is closer to the central axis CL of a connecting portion 45$b$1 than the peak position P2 of the second projecting portion 51$e$.

In this insulating member 51A, although it is necessary to form the first projecting portion 32$a$ in the lid member 32, it is not necessary to form a step portion in a flange portion 45$b$2. Therefore, in comparison with the structure disclosed in the JP 2014-049396 A, it is possible to manage dimensional accuracy easily at the time of manufacturing. Further, since the peak position P1 of the first projecting portion 32$a$ is closer to the central axis CL of the connecting portion 45$b$1 than the peak position P2 of the second projecting portion 51$e$, it is still possible to obtain action effects shown in FIG. 11.

(The Third Embodiment)

Figure 18:
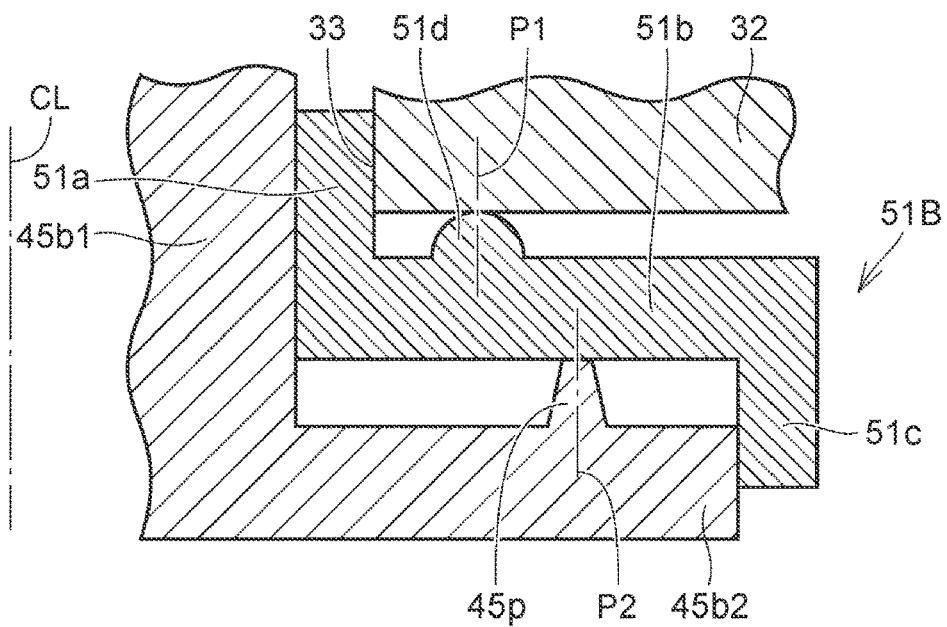
FIG. 18 is a view of a sectional shape of an insulating member according to the third embodiment.

Next, with reference to FIG. 18, a shape of an insulating member 51B according to the third embodiment is explained. FIG. 18 is a view of a sectional shape of the insulating member 51B.

In comparison with the structure of the insulating member 51 according to the first embodiment, only the first projecting portion 51$d$ is formed, and the second projecting portion 51$e$ is not formed in the insulating member 51B according to this embodiment. As a substitute of the second projecting portion 51$e$, a second projecting portion 45$p$ is provided in a flange portion 45$b$2, projecting towards a flat plate portion 51$b$ side of the insulating member 51B.

Also, the peak position P1 of the first projecting portion 51$d$ is closer to the central axis CL of a connecting portion 45$b$1 than the peak position P2 of the second projecting portion 45$p$.

In this insulating member 51B, although it is necessary to form the second projecting portion 45$p$ in the flange portion 45$b$2, it is not necessary to form a projecting portion in a lid member 32. Therefore, it is possible to manage dimensional accuracy more easily at the time of manufacturing in comparison with the structure disclosed in JP 2014-049396 A. peak position P1 of the first projecting portion 51$d$ is closer to the central axis CL of the connecting portion 45$b$1 than the peak position P2 of the second projecting portion 45$p$. Therefore, it is still possible to obtain the action effects shown in FIG. 11.

In the foregoing embodiments, the cases are explained where the first projecting portion and the second projecting portion are provided one by one. However, it is possible to provide a plurality of them as necessary.

The embodiments based on the disclosure have been explained so far. However, those described herein are only examples in every aspect and are not restrictive. The technical scope of the disclosure is represented by the scope of claims, and it is intended to include all changes without departing from the meaning and scope that are equivalent to the scope of claims.

What is claimed is:

1. A sealed battery comprising:
a power generation element;
a case member having a bottomed cylindrical shape, in which the power generation element is housed;
a lid member that closes an opening of the case member and is provided with a through hole;
a collector terminal member having one end connected with the power generation element inside the case member, and the other end that is arranged in the through hole and extended outside the lid member; and
an insulating member arranged between the lid member and the collector terminal member, wherein
the other end of the collector terminal member includes a connecting portion having a columnar shape, that goes through the through hole, and a flange portion that is arranged so as to be approximately parallel with the lid member,
the insulating member includes a cylindrical portion that is positioned between the through hole and the connecting portion and surrounds the connecting portion, and a flat plate portion that is positioned between the lid member and the flange portion, the cylindrical portion and the flat plate portion being integral with the insulating member,
the flat plate portion has a first projecting portion projecting towards the lid member, and a second projecting portion projecting towards the flange portion, the first projecting portion and the second projecting portion being integral with the insulating member,
in a sectional view taken along a virtual plane including a central axis of the connecting portion,
the first projecting portion is provided at a position where a first side of the first projecting portion is linearly symmetrical with a second side of the first projecting portion, opposite from the first side, with respect to the central axis,
the second projecting portion is provided at a position where a first side of the second projecting portion is linearly symmetrical with a second side of the second projecting portion, opposite from the first side, with respect to the central axis,
a peak of the first projecting portion is provided at a position closer to the central axis than a peak position of the second projecting portion
the first projecting portion is provided into a ring shape centering about the central axis,
the second projecting portion is provided into a ring shape centering about the central axis, and
the first projecting portion is in contact with a surface of the lid member and the second projecting portion is in contact with a surface of the collector terminal.

2. The sealed battery of claim 1, wherein the first projecting portion and the second projecting portion are compressed.

3. The sealed battery of claim 1, wherein the insulating member is a single body.

4. The sealed battery of claim 1, wherein the second projecting portion protrudes toward and contacts a top surface of the flange portion of the collector terminal member.

5. A sealed battery comprising:
a power generation element;
a case member having a bottomed cylindrical shape, in which the power generation element is housed;
a lid member that closes an opening of the case member and is provided with a through hole;
a collector terminal member having one end connected with the power generation element inside the case member, and the other end that is arranged in the through hole and extended outside the lid member; and
an insulating member arranged between the lid member and the collector terminal member, wherein
the other end of the collector terminal member includes a connecting portion having a columnar shape, that goes through the through hole, and a flange portion that is arranged so as to be approximately parallel with the lid member,
the insulating member includes a cylindrical portion that is positioned between the through hole and the connecting portion and surrounds the connecting portion, and a flat plate portion that is positioned between the lid member and the flange portion, the cylindrical portion and the flat plate portion being integral with the insulating member,
the lid member includes a first projecting portion projecting towards the insulating member,
the flat plate portion includes a second projecting portion projecting towards the flange portion,
the first projecting portion being integral with the lid member and the second projecting portion being integral with the insulating member,
the first projecting portion is in contact with a surface of the insulating member and the second projecting portion is in contact with a surface of the collector terminal,
in a sectional view taken along a virtual plane including a central axis of the connecting portion,
the first projecting portion is provided at a position where a first side of the first projecting portion is linearly symmetrical with a second side of the second projecting portion, opposite from the first side, with respect to the central axis,
the second projecting portion is provided at a position where a first side of the second projecting portion is linearly symmetrical with a second side of the second projecting portion, opposite from the first side, with respect to the central axis,
a peak of the first projecting portion is provided at a position closer to the central axis than a peak position of the second projecting portion,
the first projecting portion is provided into a ring shape centering about the central axis, and
the second projecting portion is provided into a ring shape centering about the central axis.

6. The sealed battery of claim 5, wherein the first projecting portion and the second projecting portion are compressed.

7. The sealed battery of claim 5, wherein the insulating member is a single body.

8. The sealed battery of claim 5, wherein the second projecting portion protrudes toward and contacts a top surface of the flange portion of the collector terminal member.

9. A sealed battery comprising:
a power generation element;
a case member having a bottomed cylindrical shape, in which the power generation element is housed;
a lid member that closes an opening of the case member and is provided with a through hole;
a collector terminal member having an one end connected with the power generation element inside the case member, and the other end that is arranged in the through hole and extended outside the lid member; and an insulating member arranged between the lid member and the collector terminal member, wherein the other end of the collector terminal member includes a connecting portion having a columnar shape, that goes through the through hole, and a flange portion that is arranged so as to be approximately parallel with the lid member, the insulating member includes a cylindrical portion that is positioned between the through hole and the connecting portion and surrounds the connecting portion, and a flat plate portion that is positioned between the lid member and the flange portion, the cylindrical portion and the flat plate portion being integral with the insulating member, the flat plate portion includes a first projecting portion projecting towards the lid member, the flange portion includes a second projecting portion projecting towards the insulating member, the first projecting portion being integral with the insulating member and the second projecting portion being integral with the collector terminal, the first projecting portion is in contact with a surface of the lid member and the second projecting portion is in contact with a surface of the insulating member, in a sectional view taken along a virtual plane including a central axis of the connecting portion, the first projecting portion is provided at a position where a first side of the first projecting portion is linearly symmetrical with a second side of the second projecting portion, opposite from the first side, with respect to the central axis, the second projecting portion is provided at a position where a first side of the second projecting portion is linearly symmetrical with a second side of the second projecting portion, opposite from the first side, with respect to the central axis, a peak of the first projecting portion is provided at a position closer to the central axis than a peak position of the second projecting portion, the first projecting portion is provided into a ring shape centering about the central axis, and the second projecting portion is provided into a ring shape centering about the central axis.

10. The sealed battery of claim 9, wherein the first projecting portion and the second projecting portion are compressed.

11. The sealed battery of claim 9, wherein the insulating member is a single body.

* * * * *